United States Patent
Tsutsumi et al.

(10) Patent No.: US 6,811,387 B1
(45) Date of Patent: Nov. 2, 2004

(54) ELECTRIC INJECTION MOLDING MACHINE

(75) Inventors: Seisuke Tsutsumi, Tokyo (JP); Yukihiko Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/296,617

(22) PCT Filed: May 26, 2000

(86) PCT No.: PCT/JP00/03407

§ 371 (c)(1),
(2), (4) Date: Nov. 26, 2002

(87) PCT Pub. No.: WO01/89800

PCT Pub. Date: Nov. 29, 2001

(51) Int. Cl.[7] ............................................... B29C 45/77
(52) U.S. Cl. ...................................... 425/149; 264/40.5
(58) Field of Search ........................... 425/549; 264/40.5

(56) References Cited

U.S. PATENT DOCUMENTS 4,207,047 A * 6/1980 Kolb et al. .................. 425/149
4,851,170 A * 7/1989 Shimizu et al. ............. 425/149
4,851,171 A * 7/1989 Shimizu et al. ............. 425/149

FOREIGN PATENT DOCUMENTS

| EP | 0582987 | * | 2/1994 |
| JP | 1-24055 | * | 10/1989 |
| JP | 5-43495 | * | 1/1993 |
| JP | 09277328 | * | 10/1997 |

* cited by examiner

Primary Examiner—Tim Heitbrink
(74) Attorney, Agent, or Firm—Sughrue Mion, PLLC

(57) ABSTRACT

There are provided an injection molding machine 10 having a screw 7 that can be moved in a cylinder 5, a pressure commanding device for generating a pressure command value applied to the screw 7, a pressure sensor 12 for sensing a pressure applied to the screw 7, a pressure subtracter 22 for calculating a deviation value between the pressure command value of the pressure commanding device and a sensed value of the pressure sensor 12, a pressure amplifier 201 for amplifying the deviation value of the pressure subtracter 22 at a predetermined amplification factor and changing an amplification factor value based on a pressure value of the pressure sensor 12, and a servo motor 14 driven based on an output value of the pressure amplifier 201 to move the screw 7.

2 Claims, 5 Drawing Sheets

ELECTRIC INJECTION MOLDING MACHINE

TECHNICAL FIELD

The present invention relates to an electric injection molding machine for injecting molten resin into a mold to obtain a molding.

BACKGROUND ART

An electric injection molding machine according to the related art will be explained with reference to FIG. 3 disclosed in Japanese Patent Application Publication (KOKAI) No.Hei.4-334430 hereunder.

In FIG. 3, an electric injection molding machine that pours resin 3 into a mold 1 to obtain an object having a predetermined shape has an injection molding machine 10 having a screw 7 in a cylinder 5, a pressure sensor 12 for sensing the pressure in the cylinder 5 based on the pressure applied to the screw 7, a servo motor 14 coupled/fixed to the screw 7, a position/speed sensor 16 for sensing the position and the speed based on the rotation angle of the servo motor 14, a current sensor 18 for sensing the current flowing through the servo motor 14, and a control portion 20 for driving/controlling the servo motor 14 based on sensed values of the pressure sensor 12, the position/speed sensor 16, and the current sensor 18 and command values.

The control portion 20 has a pressure subtracter 22 for calculating a pressure deviation between a pressure command Pr of the screw 7 and a pressure sensed value Pa of the pressure sensor 12, a pressure amplifier 24 for getting a speed command Nr by multiplying the pressure deviation by a dwell pressure control gain, a speed subtracter 26 for calculating a speed deviation between a speed command Nr and a speed sensed value Na, a speed amplifier 28 for getting a current command Ir by multiplying the speed deviation by a speed control gain, a current subtracter 30 for calculating a current deviation between the current command Ir and a current sensed value Ia, and a current amplifier 32 for getting a power command Wr by multiplying the current deviation by a current control gain.

An operation of the electric injection molding machine constructed as above will be explained with reference to FIG. 3 hereunder.

First, assuming that an injection mode for injecting the molten resin 3 into the mold 1 is completed and then the operation is shifted to a dwell pressure mode for holding the pressure in the mold 1 at a predetermined value.

In such dwell pressure mode, the pressure command Pr in the mold 1 and a position command (not shown) of the screw 7 are input, the pressure subtracter 22 calculates the pressure deviation between the pressure command Pr and the pressure sensed value Pa from the pressure sensor 12, and the pressure amplifier 24 calculates the speed command Nr by multiplying the pressure deviation by the dwell pressure control gain and applies the speed command Nr to the speed subtracter 26.

The speed subtracter 26 calculates the speed deviation between the speed command Nr and the speed sensed value Na of the position/speed sensor 16. The speed amplifier 28 obtains the current command Ir by multiplying the speed deviation by the speed control gain. The current subtracter 30 calculates the current deviation between the current command Ir and the current sensed value Ia of the current sensor 18. The current amplifier 32 obtains the power command Wr by multiplying the current deviation by the current control gain and drives the servo motor 14 to proceed the screw 7 until the pressure applied to the shaft of the screw 7 become equal to the command value, so that the pressure is controlled at a predetermined value. Then, the operation is shifted to a back-pressure mode in which the material is supplied to the inside of the cylinder 5.

On the other hand, the input to the injection molding machine 10 as the controlled object is a rotation amount (an integrated value of the speed N) of the servo motor 14. This rotation amount is a moving amount Ls of the screw 7 and is in proportion to a volume Vs of a moving portion of the screw 7 in the cylinder 5.

On the other hand, since the output of the injection molding machine can be expressed by the pressure p in the cylinder 5, the transfer function Ga of the injection molding machine 10 is given as the following equation.

$$Ga = p/Vs \tag{1}$$

Where

Vs: changed volume ($m^3$) of the cylinder 5, p: pressure ($kg/m^3$) in the cylinder 5.

Therefore, an overall block diagram of a control system in the electric injection molding machine is given as shown in FIG. 4(a). In FIG. 4(a), Gp: dwell pressure control gain, $G_N$: speed control gain, $G_1$: current control gain, $H_I$: current feedback gain, $H_N$: speed feedback gain, Hp: pressure feedback gain, $K_I$, $K_1$: constant, J: moment of inertia ($kg/m^2$) of the servo motor 12, A: sectional area ($m^2$) of the cylinder 5, S: Laplace operator, ω: angular velocity of rotation (rad/s) of the servo motor 12, and Vs, p: mentioned above Since the speed feedback gain $H_N$ is sufficiently larger than the gain $G_1$ in a dotted line, the transfer function $G_0$ in the dotted line can be assumed as $1/H_N$. Thus, the block diagram shown in FIG. 4(a) can be simplified as shown in FIG. 4(b).

In this FIG. 4(b), if the pressure feedback gain Hp is assumed as 1, the open-loop transfer function Gs from the pressure command Pr to the pressure feedback p can be given as the following equation.

$$Gs = p/Pr = (Gp/H_N) \times (Kc/S) \times (p/Vs) \tag{2}$$

Where

Kc: constant,

S: Laplace operator.

Here, the electric injection molding machine controls p/Vs in above Eq. (2) as a constant in the dwell pressure mode.

However, this p/Vs is not constant since such p/Vs is given by the relational curve between the pressure and the volume of the cylinder 5, as shown in FIG. 5.

The relational curve of FIG. 5 can be calculated as follows. That is, the ideal condition that the resin 3 in the cylinder 5 can be changed by the compression under the conditions that the temperature is constant and the entropy is constant is assumed and also the pressure of the resin 3 is assumed totally uniform in the cylinder 5.

Since the compression ratio $\chi$ of the resin 3 in the cylinder 5 can be regarded as a constant according to such assumptions, the following equation can be satisfied.

$$\chi = -(1/Vs) \times (dVs/dp) \tag{3}$$

Where
Vs: volume (m³) in the cylinder 5,
p: pressure (kg/m³) in the cylinder 5.
Based on above Eq. (3), the volume Vs in the cylinder can be given as the following equation.

$$V_s = V_{so} \times e^{-Px} \quad (4)$$

Where
$V_{so}$: initial value of the volume (m³).
Eq(4) gives the relational curve between the pressure and the volume in the cylinder 5, as shown in FIG. 5.

Accordingly, if the pressure is controlled based on the volume in the cylinder 5 (the moving amount Ls of the screw 7) in order to control the pressure in the cylinder 5, there is the following problem since the relationship between the volume and the pressure is nonlinear, as shown in FIG. 5.

In the dwell pressure mode, as shown in FIG. 5, under the dwell pressure control gain of the constant value that is multiplied by the pressure deviation, the volume $V_1$ in the cylinder 5 is high if the pressure in the cylinder 5 has the low pressure value $P_1$, and therefore $P_1/V_1$ has the small value. Thus, if it is tried to maintain the open-loop transfer function shown in FIG. 4(b) at the constant value, a set value of the dwell pressure control gain of the pressure amplifier 24 must be increased.

Under the dwell pressure control gain value set in this manner, the volume in the cylinder 5 is reduced like $V_2$ if the pressure value of the cylinder 5 is increased to the pressure $P_2$, for example, and therefore $P_2/V_2$ becomes large. Thus, the pressure value of the screw 7 is overshot at the pressure $P_2$ against the pressure command Pr.

However, if the dwell pressure control gain value is set in a situation where the pressure in the cylinder 5 is high, there is a problem that the response to the pressure command Pr becomes slow when the pressure in the cylinder 5 is low.

DISCLOSURE OF THE INVENTION

The present invention has been made to overcome the above subjects, and it is an object of the present invention to provide an electric injection molding machine that can be controlled smoothly based on a pressure command.

An electric injection molding machine according to the present invention comprises an injection molding machine having a screw that can be moved in a cylinder; a pressure commanding means for generating a pressure command value applied to the screw; a pressure sensing means for sensing a pressure applied to the screw; a pressure deviating means for calculating a deviation value between the pressure command value of the pressure commanding means and a sensed value of the pressure sensing means; a pressure amplifying means for amplifying the deviation value of the pressure deviating means at a predetermined amplification factor; an amplification factor changing means for changing an amplification factor value of the pressure amplifying means based on a pressure value of the pressure sensing means; and a servo motor driven based on an output value of the pressure amplifying means to move the screw.

An electric injection molding machine according to the next present invention further comprises an amplification factor changing means for changing the amplification factor value of the pressure amplifying means based on the pressure command value of the pressure commanding means, in place of the amplification factor changing means for changing the amplification factor value of the pressure amplifying means based on the pressure value of the pressure sensing means.

In the electric injection molding machine according to the next present invention, the amplification factor changing means includes a storing means for receiving the pressure value of the pressure sensing means or the pressure command value of the pressure commanding means as address information and storing the amplification factor value that corresponds to the address information, a multiplying means for multiplying the amplification factor value read from the storing means and a deviation value of the pressure deviating means, and an amplifying means for amplifying an output of the multiplying means.

In the electric injection molding machine according to the next present invention, the amplification factor of the amplification factor changing means sets a ratio of the pressure value in the cylinder to a change amount of a volume of the cylinder to a substantially constant value.

BEST MODE FOR CARRYING OUT THE INVENTION

Embodiment 1

Figure 1:
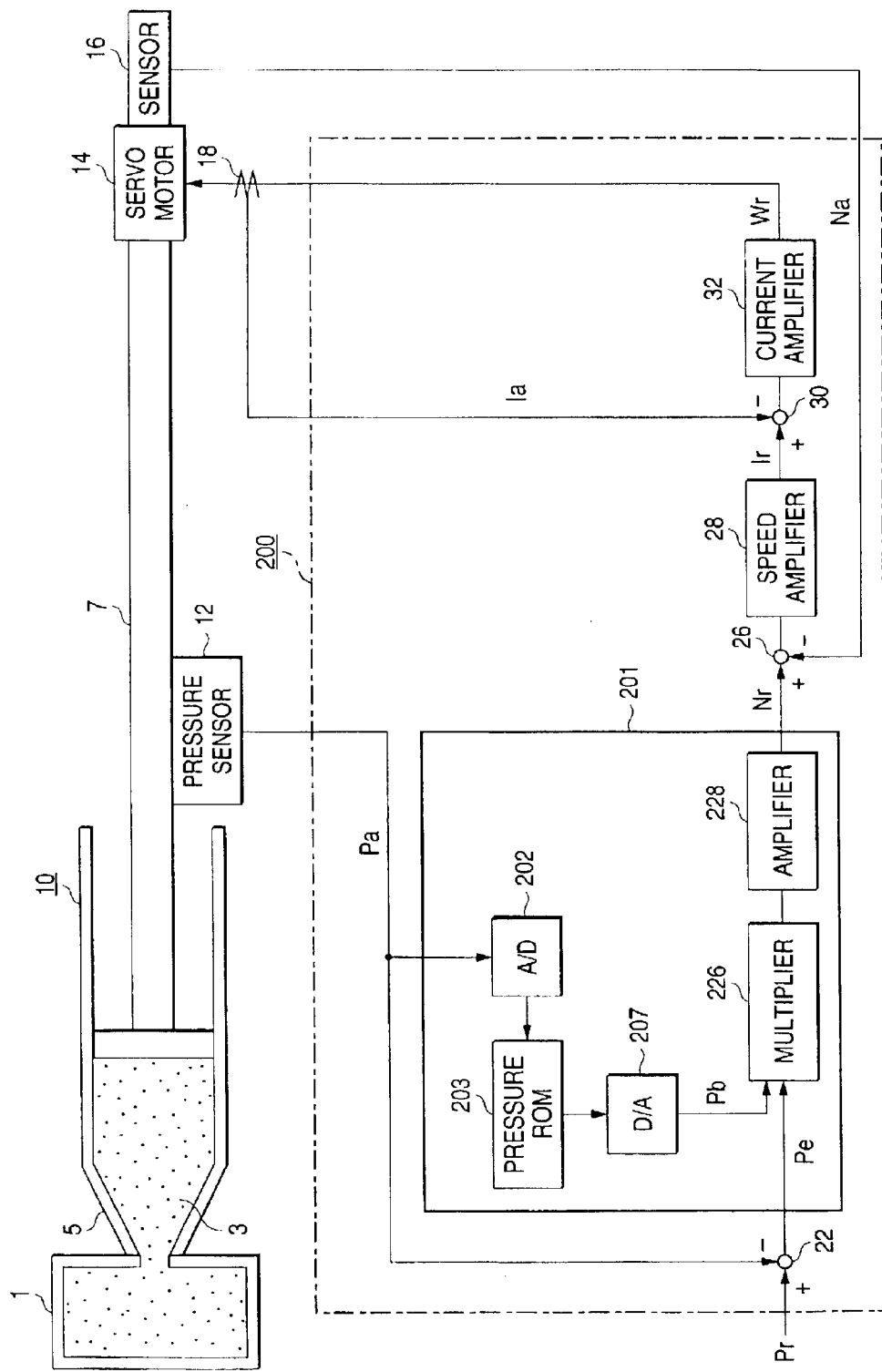
FIG. 1 is an overall block diagram of an electric injection molding machine showing an embodiment of the present invention.
Figure 3:
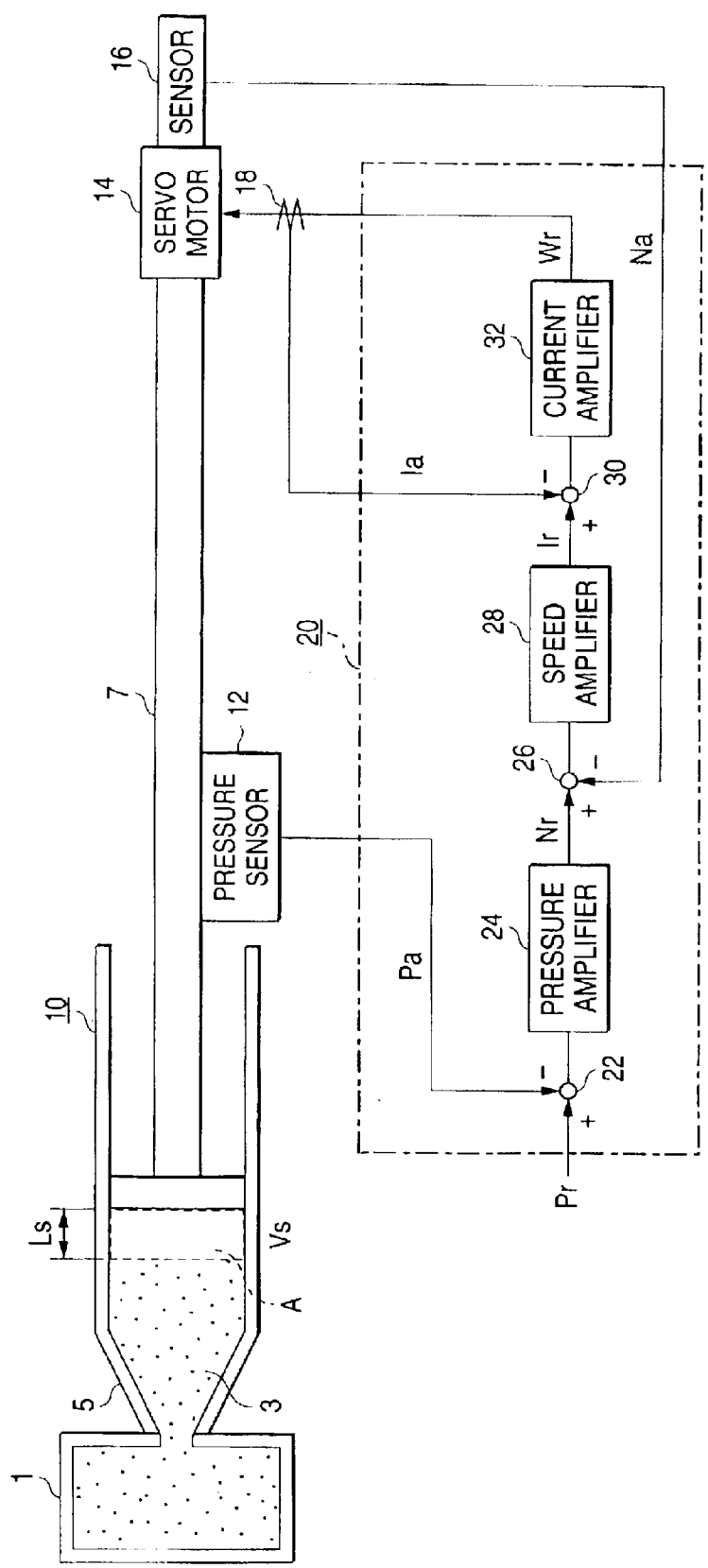
FIG. 3 is an overall block diagram of the electric injection molding machine according to the related art.
Figure 4:
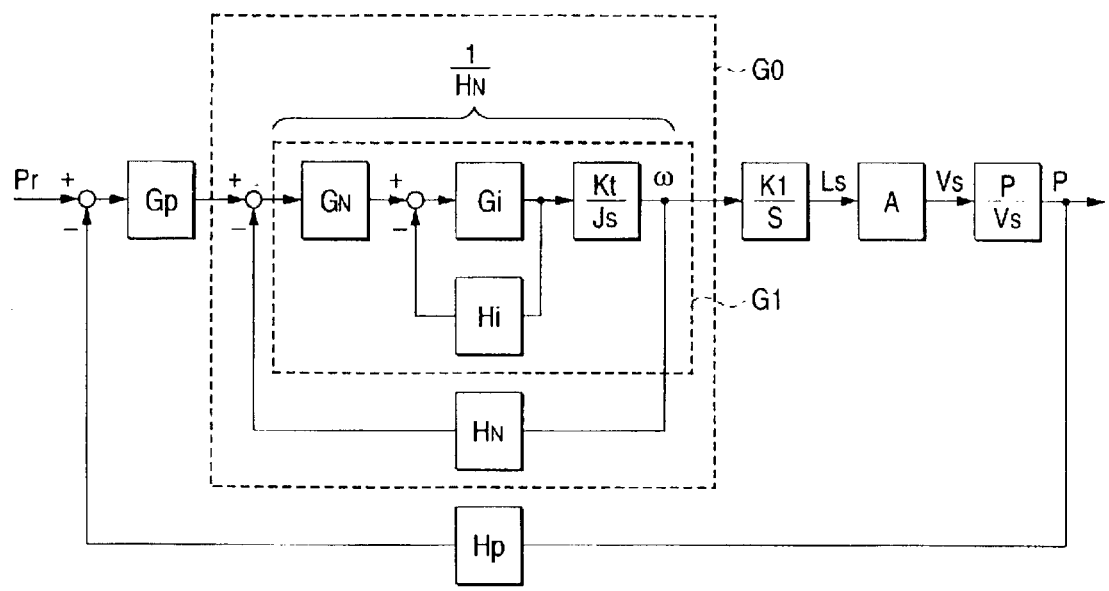
FIGS. 4a and 4b are a block diagram of a control system in the electric injection molding machine shown in FIG. 3.
Figure 4:
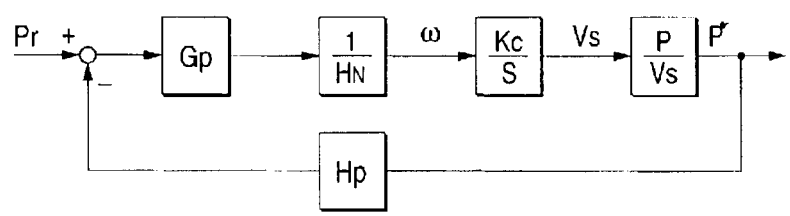
Figure 5:
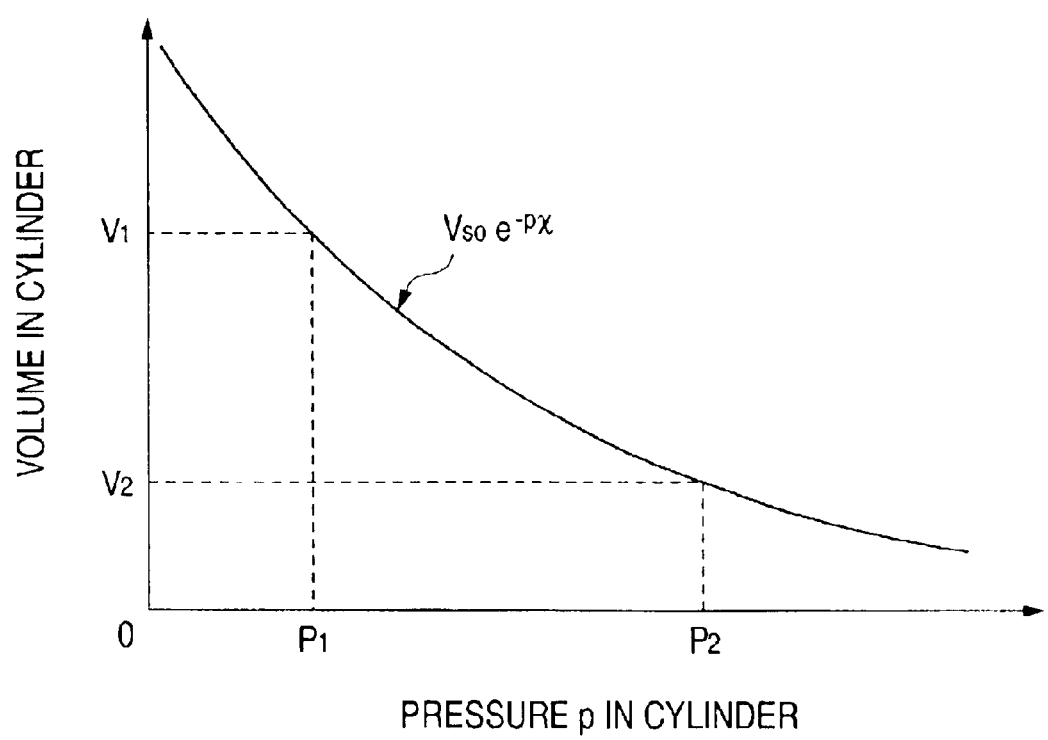
FIG. 5 is a characteristic curve indicating a relationship between a volume and a pressure in the cylinder of the electric injection molding machine shown in FIG. 3.

An embodiment of the present invention will be explained with reference to FIG. 1 hereunder. FIG. 1 is a block diagram of an electric injection molding machine showing an embodiment of the present invention. In FIG. 1, the same symbols as those in FIG. 3 denote the same or equivalent elements and their explanation will be omitted.

In FIG. 1, the electric injection molding machine has a control portion 200 that drives/controls the servo motor 14 based on the sensed values of the pressure sensor 12, the position/speed sensor 16, and the current sensor 18 and the command values.

A pressure amplifier 201 has a function as a pressure amplifying means for amplifying the deviation of the pressure subtracter 22 by the amplification factor as the pressure control gain, and also acts as an amplification factor changing means for changing the pressure control gain based on the pressure value Pa of the pressure sensor 12.

The pressure amplifier 201 has an A/D converter 202 for converting the analog signal of the pressure sensed value $P_a$ of the pressure sensor 12 into the digital signal, a pressure ROM 203 for fetching the pressure value in response to the output signal of this A/D converter 202 and fetching the reference value of the gain in response to the output signal value, a D/A converter 207 for converting the digital output signal of the pressure ROM 203 into the analog signal, a multiplier 226 for calculating the multiplied value of the output value (gain value) $P_b$ of the D/A converter 207 and the deviation value $P_e$ of the pressure subtracter 22, i.e., outputting the value that is proportional to the output value $P_b$ if the deviation value $P_e$ is constant, and an amplifier 228 for amplifying the output of the multiplier 226 and calculating the speed command $N_r$.

Figure 2:
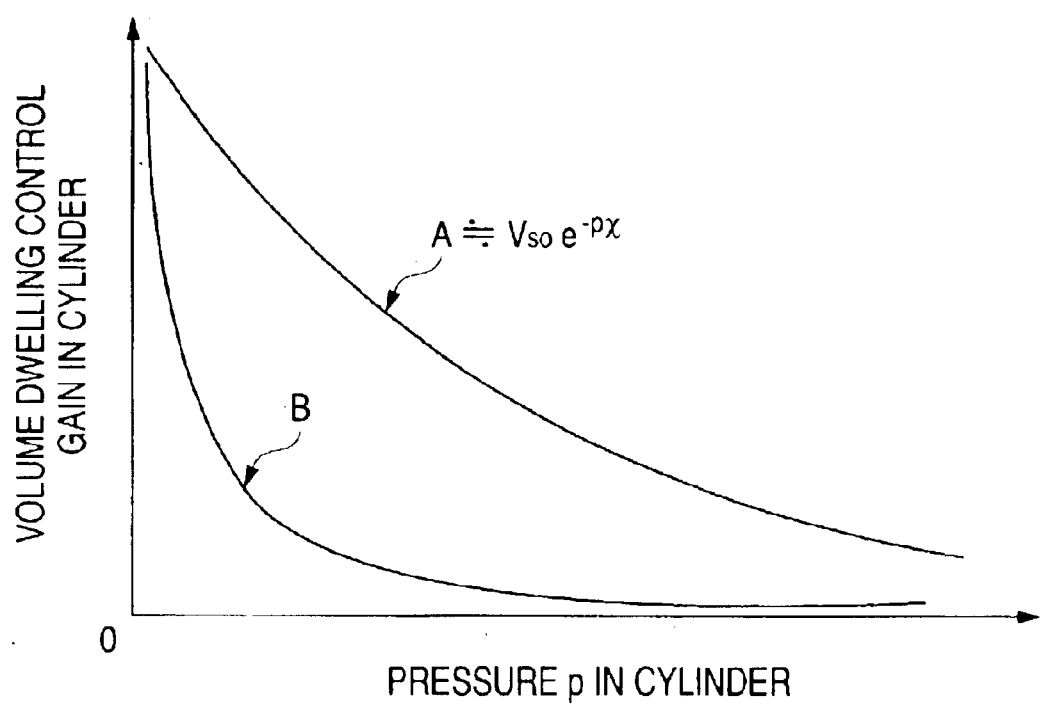
FIG. 2 is a characteristic curve indicating a relationship between a volume and a pressure in a cylinder of the electric injection molding machine shown in FIG. 1, and a characteristic curve between a dwell pressure control gain and the pressure in the cylinder.

In preparing the pressure ROM 203, first the molten resin 3 is injected into the mold 1, then the control portion 200 causes the screw 7 to advance toward the mold 1 by driving the servo motor 14, then the position/speed sensor 16 senses the moved position of the screw 7 to calculate the volume of the cylinder 5, that is previously correlated with the moved position, and then the pressure sensor 12 measures the pressure value, whereby the relational curve A between the pressure and the volume in the cylinder 5 shown in FIG. 2 can be obtained.

Based on the relational curve A in FIG. 2, a gain curve B indicating the dwell pressure control gain Gp to satisfy the following equation is calculated.

$$Gp \times (P/Vs) = \text{constant} \qquad (5)$$

Where

Gp: dwell pressure control gain,

P/Vs: transfer function of the pressure in the cylinder (above Eq. (1))

Based on the gain curve B, stored information of the pressure ROM 203 are prepared with taking the amplification factor of the pressure amplifier 228 into consideration.

That is, the pressure ROM 203 is constructed such that the gain reference values that are decided based on the gain curve B in response to the pressure value (digital) sensed by the pressure sensor 12 are stored therein and the gain reference value (digital) is output in response to the address input.

Therefore, the pressure amplifier 201 can control P/Vs in above Eq. (2) in the open-loop transfer function Gs of the injection molding machine substantially constant by converting the pressure value the pressure sensor 12, which is the analog value, into the digital value as the input of the pressure ROM 203 by the A/D converter 202, then converting the output of the pressure ROM 203, which is the digital value, into the analog value by the D/A converter 207, and then changing the dwell pressure control gain in response to the pressure value.

Next, an operation of the electric injection molding machine constructed as above will be explained with reference to FIG. 1 and FIG. 2 hereunder. First, assuming that the injection mode for injecting the molten resin 3 into the mold 1 is completed, and then the operation is shifted to the dwell pressure mode for holding the pressure in the mold 1 at a predetermined value.

In the dwell pressure mode, the pressure command Pr for indicating the target pressure in the cylinder 5 and a position command (not shown) for indicating the final target position of the screw 7 are input from the outside.

The pressure subtracter 22 calculates the deviation value Pe between the pressure command Pr and the pressure sensed value Pa from the pressure sensor 12. The A/D converter 202 converts the pressure sensed value Pa of the pressure sensor 12 from the analog signal into the digital signal. The pressure ROM 203 receives the pressure sensed value Pa as the address input and outputs the dwell pressure control gain, which is the digital value and is shown in the gain curve B in FIG. 2 corresponding to the address, as the gain reference value. The D/A converter 207 converts the digital value into the analog signal to get the gain command Pb.

The multiplier 226 multiplies the gain command Pb by the deviation value Pe of the pressure subtracter 22 to get the multiplied value. The amplifier 228 amplifies the multiplied value to get the speed command Nr. The speed subtracter 26 calculates the speed deviation between the speed command Nr and the speed sensed value Na of the servo motor 14 sensed by the position/speed sensor 16. The speed amplifier 228 obtains the current command Ir by multiplying the deviation value of the speed subtracter 26 by the set speed control gain value to drive the servo motor 14.

In this manner, since P/Vs in the open-loop transfer function of the injection molding machine can be controlled almost constant, the pressure in the cylinder 5 can be controlled smoothly.

In this case, the gain of the pressure amplifier 201 is changed based on the pressure sensed value Pa from the pressure sensor 12. However, such gain of the pressure amplifier 201 may be changed based on the pressure command Pr.

According to such configuration, the responsibility of the pressure control of the screw 7 can be improved.

Also, in the above embodiment, the change of the gain of the pressure amplifier 201 is explained in the dwell pressure mode. It is needless to say that, since the embodiment can be applied to any pressure control mode, such embodiment can be applied to the injection mode.

Since the present invention is constructed as mentioned above, the advantages described in the following can be achieved.

According to the present invention, there are provided a pressure deviating means for calculating a deviation value between the pressure command value of the pressure commanding means and a sensed value of the pressure sensing means, a pressure amplifying means for amplifying the deviation value of the pressure deviating means at a predetermined amplification factor, an amplification factor changing means for changing an amplification factor value of the pressure amplifying means based on a pressure value of the pressure sensing means, and a servo motor driven based on an output value of the pressure amplifying means to move the screw. Therefore, there can be achieved the advantage that the pressure in the cylinder can be controlled smoothly in the electric injection molding machine.

According to the next present invention, the amplification factor value of the pressure amplifying means is changed based on the pressure command value of the pressure commanding means. Therefore, there can be achieved the advantage that the responsibility of the pressure control of the screw can be improved.

According to the next present invention, the amplification factor changing means includes a storing means for receiving the pressure value of the pressure sensing means or the pressure command value of the pressure commanding means as address information and storing the amplification factor value that corresponds to the address information, a multiplying means for multiplying the amplification factor value read from the storing means and a deviation value of the pressure deviating means, and an amplifying means for amplifying an output of the multiplying means. Therefore, there can be achieved the advantage that the amplification factor changing means can be simply constructed.

According to the next present invention, the amplification factor of the amplification factor changing means sets a ratio of the pressure value in the cylinder to a change amount of a volume in the cylinder to a substantially constant value. Therefore, there can be achieved the advantage that the pressure in the cylinder can be controlled more smoothly.

INDUSTRIAL APPLICABILITY

As described above, the electric injection molding machine according to the present invention is suitable for being applied to controlling optimally the pressure in the cylinder.

What is claimed is:

1. An electric injection molding machine comprising:

an injection molding machine having a screw that can be moved in a cylinder;

a pressure commanding means for generating a pressure command value applied to the screw;

a pressure sensing means for sensing a pressure applied to the screw;

a pressure deviating means for calculating a deviation value between the pressure command value of the pressure commanding means and a sensed value of the pressure sensing means;

a storing means for employing a pressure value of the pressure sensing means as address information to respond the address, and storing a gain reference value based on a relationship between a pressure and a volume of the cylinder;

a multiplying means for multiplying the gain reference value read from the storing means and the deviation value of the pressure deviating means;

an amplifying means for amplifying an output of the multiplying means; and a servo motor driven based on an output value of the amplifying means to move the screw.

2. The electric injection molding machine according to claim 1, wherein the gain reference value of the storing means sets a ratio of the pressure value in the cylinder to a volume in the cylinder to a substantially constant value.

* * * * *